(12) United States Patent
Petri et al.

(10) Patent No.: US 7,975,837 B2
(45) Date of Patent: Jul. 12, 2011

(54) CONVEYOR WITH SAFETY GATE

(75) Inventors: Kenneth Petri, Richardson, TX (US); Anselm Pajuodis, Lewisville, TX (US); Steven Bullard, Little Elm, TX (US)

(73) Assignee: Heat and Control, Inc., Flower Mound, TX (US)

( * ) Notice: Subject to any disclaimer, the term of this patent is extended or adjusted under 35 U.S.C. 154(b) by 25 days.

(21) Appl. No.: 12/635,860

(22) Filed: Dec. 11, 2009

(65) Prior Publication Data

US 2011/0139588 A1    Jun. 16, 2011

(51) Int. Cl.
*B65G 25/04*    (2006.01)

(52) U.S. Cl. ............... 198/758; 198/735.3; 198/860.3

(58) Field of Classification Search ............... 198/735.3, 198/735.4, 750.1, 758, 765, 771, 860.3, 860.4
See application file for complete search history.

(56) References Cited

U.S. PATENT DOCUMENTS

| | | | |
|---|---|---|---|
| 4,402,138 A | 9/1983 | Glockle et al. | |
| 4,573,567 A * | 3/1986 | Swinderman | 198/860.4 |
| 4,741,482 A | 5/1988 | Coggiola et al. | |
| 5,119,841 A | 6/1992 | McGill | |
| 5,351,807 A | 10/1994 | Svejkovsky | |
| 5,794,757 A | 8/1998 | Svejkovsky et al. | |
| 6,189,683 B1 | 2/2001 | Svejkovsky et al. | |
| 6,409,011 B1 | 6/2002 | Ferguson | |
| 6,646,398 B1 | 11/2003 | Fukazawa et al. | |
| 6,691,853 B1 * | 2/2004 | Basketfield | 198/860.4 |
| 6,953,359 B1 * | 10/2005 | Morelli | 439/319 |
| 7,377,560 B2 | 5/2008 | Wiemer et al. | |
| 7,735,632 B1 * | 6/2010 | Garlow et al. | 198/750.3 |
| 7,866,459 B2 * | 1/2011 | Patterson et al. | 198/735.4 |

* cited by examiner

*Primary Examiner* — James R Bidwell
(74) *Attorney, Agent, or Firm* — Browning Bushman P.C.

(57) ABSTRACT

A conveyor (10) includes an elongate tray (12) for supporting goods thereon, and a powered drive (16) to move goods along the tray. In one embodiment, a gate (24) is supported on this tray for closing an opening in the tray or for opening to allow goods to drop through the tray opening. The gate has a first magnet (34) supported thereon. A gate drive (22) moves the gate between the open and closed positions, and has a second magnet (32) which cooperates with the first magnet such that the magnets separate if the gate encounters an obstruction when closing.

24 Claims, 5 Drawing Sheets

CONVEYOR WITH SAFETY GATE

FIELD OF THE INVENTION

The present invention relates to a conveyor of the type having a supporting tray and one or more gates. More particularly, the invention relates to a conveyor with a tray powered to move goods along the tray. The safety gate effectively decouples from the gate drive to prevent accidents.

BACKGROUND OF THE INVENTION

Various types of conveyors exist, and many conveyors include a tray for supporting goods thereon. Vibratory conveyors have been used for decades. More recently, trays powered to move forward at a slower speed than the tray return slide goods along the tray during the return, thereby moving goods forward. These conveyors frequently include one or more gates which move to an open position to allow goods to fall through an opening in the tray, and to a closed position to effectively close off the opening in the tray so all goods move downstream from the gate.

Various types of safety devices have used magnets to achieve a desired purpose. For example, U.S. Pat. No. 4,402,138 discloses a safety device having a magnet for use on a chain saw, and U.S. Pat. No. 4,741,482 discloses a magnetic safety switch for a food processor. Safety device and safety shut off closures are disclosed in U.S. Pat. Nos. 5,119,841, 6,646,398, and 7,377,560. U.S. Pat. No. 6,409,011 discloses a conveyor gate for a conveyor having an endless belt.

The disadvantages of the prior art are overcome by the present invention, and an improved conveyor with a safety gate is hereinafter disclosed.

SUMMARY OF THE INVENTION

In one embodiment, a conveyor comprises an elongate tray for supporting goods thereon, and a powered drive for driving a tray in a forward direction at a first speed and in a backward direction at a second speed greater than the first speed, thereby moving goods along the tray. A gate is supported on the tray for closing an opening in the tray and for opening to allow the goods to drop through the tray opening. The gate has a first magnet member supported thereon. A gate drive is provided for moving the gate between the open and closed positions. The gate drive is secured to the tray and has a second magnet member on a rod end of the gate drive for cooperation with the first magnet member, such that magnetic attractive forces pull the tray to the closed position. Other embodiments utilize a pivoting gate and/or a different type of tray drive, or use a conveyor with a "gateless" tray.

These and further features and advantages of the present invention will become apparent from the following detailed description, wherein reference is made to the figures in the accompanying drawings.

DETAILED DESCRIPTION OF PREFERRED EMBODIMENTS

Figure 1:
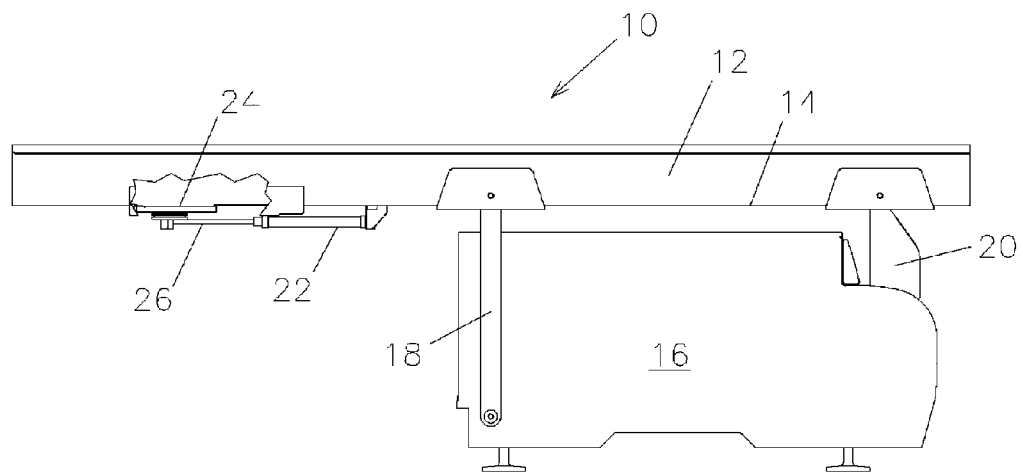
FIG. 1 is a simplified side view of a conveyor according to present invention.
Figure 2:
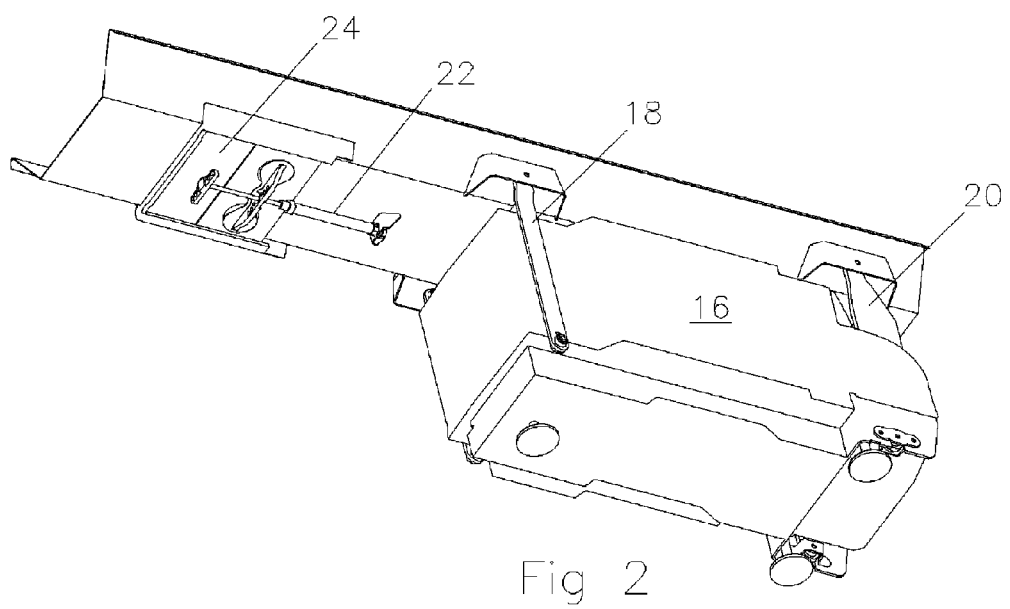
FIG. 2 is a bottom pictorial view of the conveyor shown in FIG. 1.

FIGS. 1 and 2 illustrate the conveyor 10 according to the present invention, including an elongate tray 12 having a substantially planar floor 14 for supporting goods thereon. Conveyor tray 12 is supported from power drive assembly 16, and arms 18, 20 are powered by the drive and extend upward to support the tray and to drive the tray in the desired forward and backward direction. The present invention is particularly suitable for use with a conveyor having a powered drive which drives the tray in a forward direction at first speed, and then returns the tray in a backward direction at a second speed greater than the first speed, such that goods move along the tray during the return stroke. Drives of this type of are disclosed in U.S. Pat. Nos. 5,351,807, 5,794,757, and 6,189,683.

Figure 3:
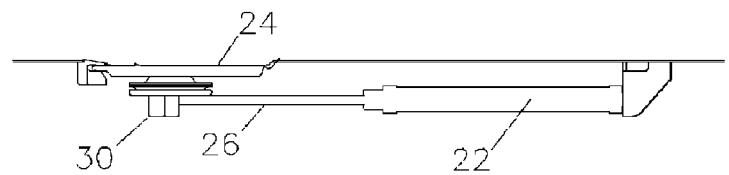
FIG. 3 is a simplified side view of the gate in the closed position.

Referring now to FIGS. 1 and 3, a portion of the tray 12 is cut away in FIG. 1 to depict a gate drive 22, which may be in the form of a pneumatically powered cylinder, with the gate drive 22 being connected to the gate 24 by the drive rod 26. As seen more clearly in FIG. 3, the drive rod 26 passes through gate closing member 28 which is secured to the gate 24, thereby providing support for the forward end of the rod 26. As discussed further below, end member 30 attached to the rod 26 includes one or more magnets, with opposing magnets being provided on the gate closing member 28, so that extension of rod 26 moves end member 30 forward, which effectively pulls the gate closing member 28 and the gate 24 to the closed position.

Figure 4:
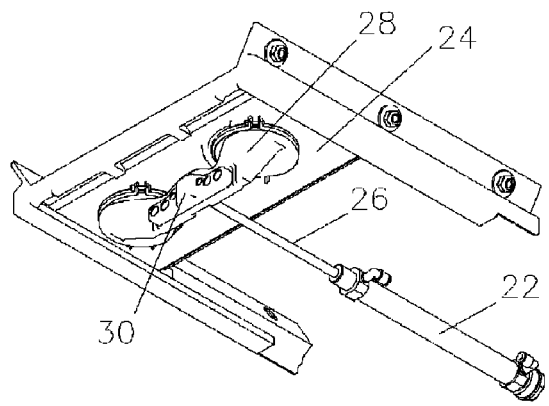
FIG. 4 is a bottom pictorial view of the gate shown in FIG. 3.
Figure 5:
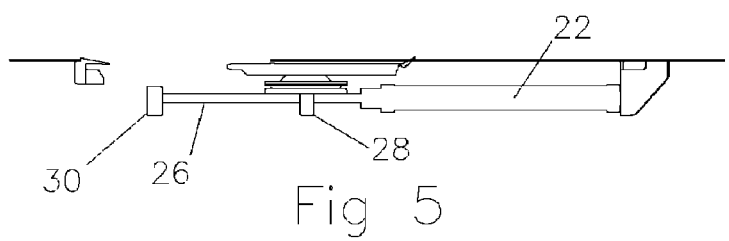
FIG. 5 is a simplified side view of the gate decoupled from the gate drive.
Figure 6:
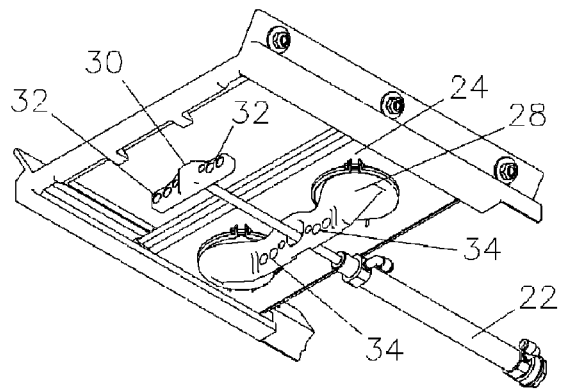
FIG. 6 is a bottom pictorial view of the gate shown FIG. 5.

FIG. 4 illustrates in further detail the gate closing member 28 and the end member 30, the gate 24, and the cylinder 22. FIG. 5 shows the end member 30 on the cylinder rod 26 released from the gate closing member 28. If a hand or other appendage should inadvertently enter the opening as the gate closes, the present invention will allow the gate drive to effectively break free from the gate, as shown in FIG. 5, so that any harm will be minimized or eliminated. FIG. 6 depicts magnet 32 mounted in the end member 30, and corresponding magnets 34 mounted on the gate closing member 28. Magnets 32 have a polarity such that they are attracted to the magnets 34 to serve the desired purpose of normally maintaining the magnets in an engaged position while allowing the magnets to release, and also laterally and vertically aligns the magnets and thus the end member 30 with the gate closing member 28. It is a particular feature that the magnets 32, 34 have substantially planar faces that engage when the magnet members are coupled together. The magnets will thus move along these planar faces until the magnets and their supporting components are substantially aligned.

As indicated above, the pneumatic cylinder is a suitable form of a gate drive for opening and closing the gate. Another alternative is a motorized linear ball screw cylinder which has the disadvantages of a higher expense and more wear, but can be arranged to stop at any linear position along the stroke length.

The present invention is particularly well suited for the type of conveyor disclosed above, since this type of conveyor provides significantly reduced g-forces compared to vibratory conveyors, which typically input g-forces in the range 6-8 g's to the tray. Slow forward/fast back conveyors as discussed herein conventionally produce g-forces less than 3.5 g's on the tray. The same mass gate in a vibratory conveyor would require a magnetic holding force of 1.7-2.3 times that required by a slow forward/fast back conveyor. By minimizing the g-forces present during normal operation of the conveyor, the magnets can be set to release at a slight increase over those g-forces, which increase normally would be attributable to a hand or other object engaging an end of the tray or becoming jammed between the tray edge and the end of the opening in the tray. This is a significant feature of the present invention, since the force required to break the magnets apart effectively decouples the gate and the gate drive will be well within the desired safe limit. In many applications, a force of 30 pounds or less may be used to decouple the magnets. This force is relatively low, and the action of engaging a hand or other object is typically an impulse force to the gate which breaks the magnetic connection.

During the gate drive retraction motion when the gate is opening, the mechanical components overlap between the drive and the gate, placing the magnets in compression. This motion requires a significant force and some mass of the gate tray, being induced to move downstream by the horizontal motion action, has to be overcome in addition to the acceleration of the tray backwards. The attractive force of the magnets at this time are irrelevant, one member simply pushes against another.

The gate closing motion requires a desired force to normally maintain the coupling components engaged. With the mass and the gate tray already being induced to move downstream due to the horizontal motion action, the minimal required magnetic coupling force is lower than it otherwise would be. If an obstruction were to block the closing gate, the resulting impulse against the magnetic coupling would separate the magnets, decoupling the gate tray from the gate. This instantly stops the force of the closing action. During the next gate opening cycle, the gate drive, with one or more magnets on its end plate, will attract and come into contact with the mating magnet or magnets. Since the pull of the magnets 32, 34 are naturally induced to align, the correct orientation of the mating placement is assured. The coupling connection is automatically ready to cycle again, with no mechanical intervention required to reconnect. The magnets have a theoretical breakaway force that will separate the magnets if the force is slowly applied to the magnets. If the force is an impulse force, however, such as when an obstruction is normally encountered by a closing gate, the retention force of the magnets is dramatically lowered and a low impulse force is adequate to create an initial separation, which then allows the magnets to move further apart.

Figure 7:
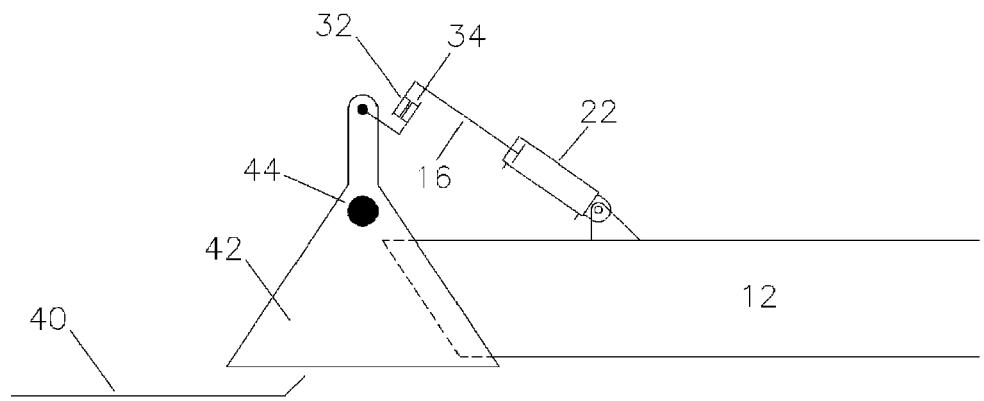
FIG. 7 is a simplified side view of a conveyor with a pivoting gate in the closed position.
Figure 8:
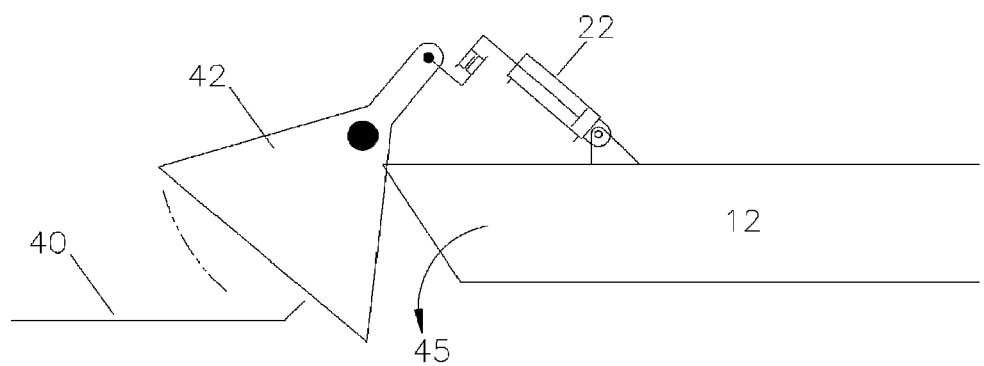
FIG. 8 illustrates a portion of conveyor shown in FIG. 7 with the gate in the open position.

FIG. 7 illustrates an alternate embodiment of the present invention, wherein a slow forward/fast backward conveyor 12 may be powered by the drive 16 previously discussed. In this case, however, the conveyor utilizes a pivoting gate 42 which pivots about axis 44. When the gate is closed, as shown in FIG. 7, goods moving along the tray 12 continue to pass by the gate 42 and to the downstream pan 40. The gate is opened by powering the air cylinder 22 to retract the rod 26, thereby opening the gate 42 to the position as shown in FIG. 8, so that product falls off the tray 22 through the opening 45.

Figure 9:
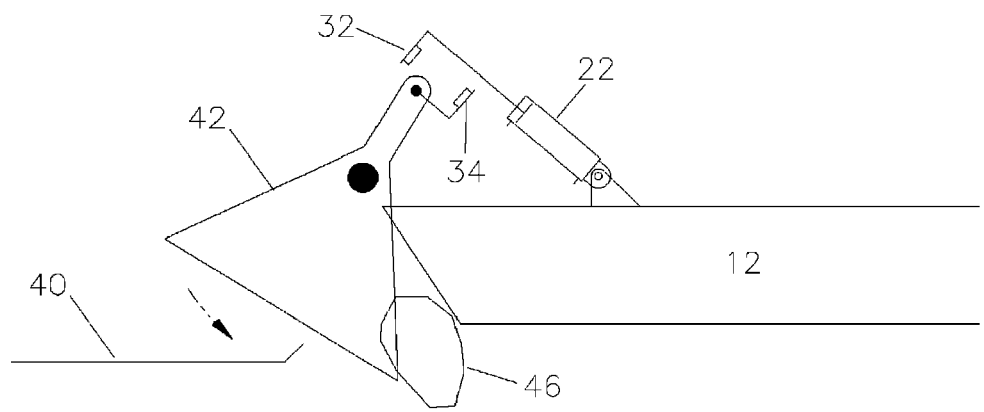
FIG. 9 illustrates the gate encountering an obstruction when moving to the closed position, causing the separation of the magnets when the gate is moved to the open position.

FIG. 9 illustrates the feature of the present invention when the pivoting gate is moving from the open position back to the closed position, and encounters an obstruction 46. During this operation, the cylinder 22 extends the rod, so that only the attractive force between magnets 32 and 34 moves the gate 42 toward the closed position. When an obstruction is encountered, the resulting force is sufficient to separate the magnets 32 and 34, thereby decoupling the gate 42 from the drive 16. During the next cylinder retraction, the magnets are automatically realigned and recoupled, reconnecting the pivot gate back to the cylinder. The obstruction may thus fall between the conveyor 12 and the gate 42 before the magnets are recoupled. During normal gate closing, the magnetic attraction forces between the magnets 32 and 34 is sufficient to maintain the magnets engaged to move the pivot gate to a closed position, but may be broken, as shown in FIG. 9, when an obstruction is encountered.

Figure 10:
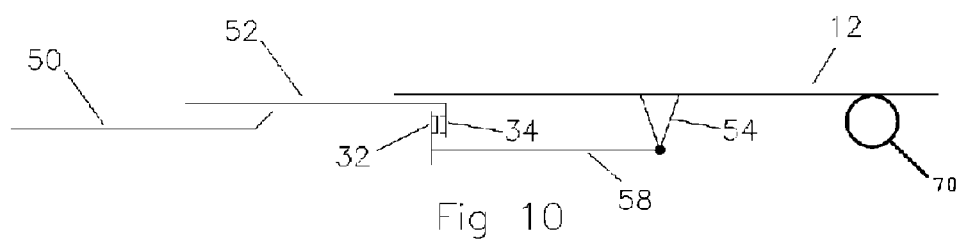
FIG. 10 illustrates another embodiment of the invention applied to a gateless system in a closed position.

FIG. 10 illustrates the concept of the present invention applied to a "gateless" conveyor system. In a gateless system, a pan or tray extension 52 is provided at the downstream end of the tray 12, effectively lengthening the tray. The tray 12 may be powered by a drive such as 16 discussed above, while the tray 12 is moved between the open and closed positions by another drive 70. Rod 58 extends between support 54 and magnet 32. The magnetic forces keep the magnets 32, 34 in engagement during normal operation, so goods transfer from the tray 12 and past the pan extension 52 so that they fall on the downstream tray or pan 50. When in the open position, the entire assembly of the tray 12, tray extension 52, and rod 58 are moved away from the downstream conveyor 50, thereby creating opening 56 through which goods may fall.

Figure 11:
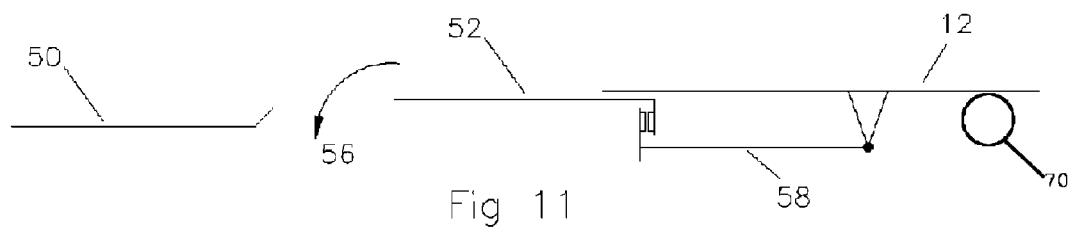
FIG. 11 illustrates the conveyor shown in FIG. 10 with the upstream tray moved to the open gate position.
Figure 12:
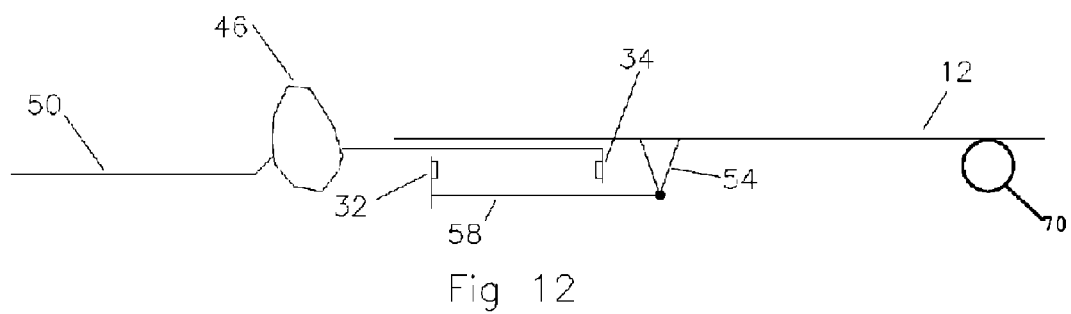
FIG. 12 illustrates the upstream tray encountering an obstruction when moving to the closed position, causing the separation of the magnets.

The potential safety problem with this gateless system occurs during movement of the tray 12 from the open position as shown in FIG. 11 back to the closed position as shown in FIG. 10. During this closing motion, the forward end of tray extension 52 may encounter an obstruction 46, such as an operator appendage, which is sandwiched between tray extension 52 and tray 50. To reduce the safety risks, the present invention will automatically separate the magnets 32 from the magnets 34, as shown in FIG. 12, if an obstruction is encountered when moving the tray 12 and the tray extension 52 back to the closed position. During the next tray retraction, the magnets will automatically realign and recouple, reconnecting the tray extension 32 and the tray 12. During normal motion, the magnetic attractive forces are sufficiently strong to maintain the coupling while moving the mass of the tray forward. In this embodiment, the tray extension 52 slides with respect to the tray between the open and closed position in a manner similar to the gate in the FIGS. 1-6 embodiment.

Figure 13:
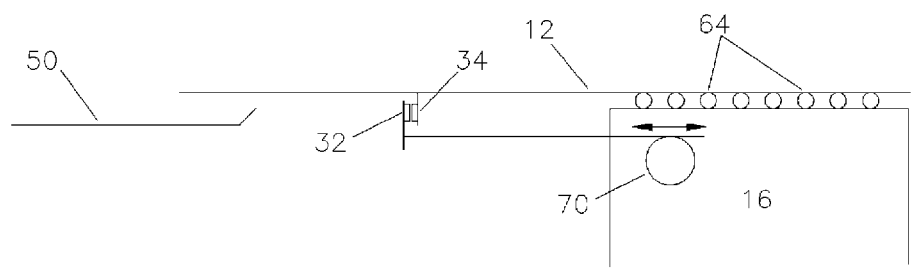
FIG. 13 illustrates another embodiment of the invention applied to a gateless system in the closed position.
Figure 14:
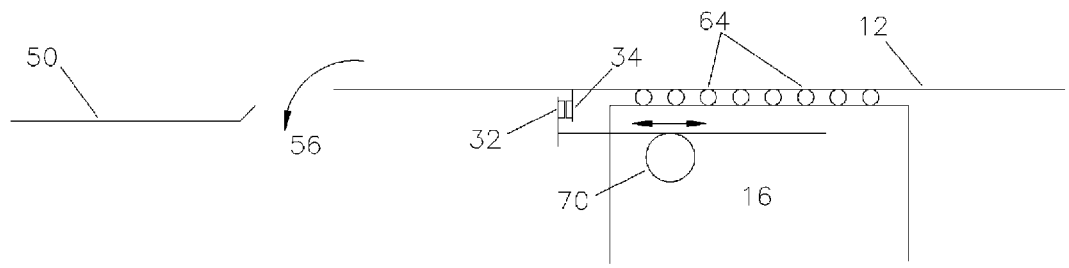
FIG. 14 illustrates that the conveyor shown in FIG. 13 with the upstream tray moved to an open position.
Figure 15:
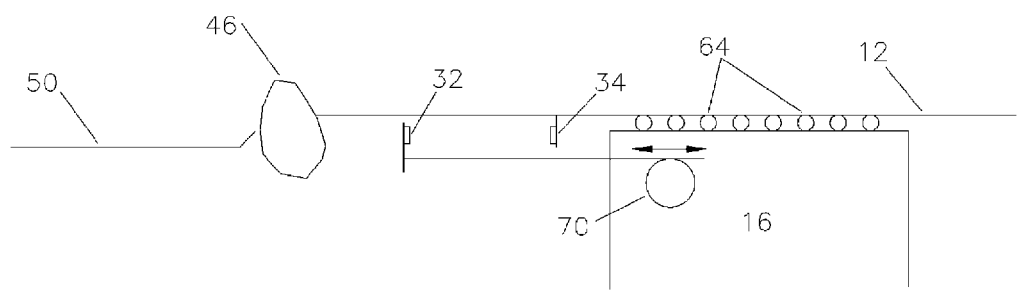
FIG. 15 illustrates the upstream tray shown in FIG. 13 encountering an obstruction while moving to the closed position, causing the separation of magnets.

FIG. 13 illustrates another embodiment of the "gateless conveyor system", in which the upstream conveyor tray 12 is powered by drive 16 to move goods in the forward direction toward the downstream conveyor 50. In this case, tray 12 is supported on rollers 64, with the magnet 32, 34 normally engaged when the drive 16 powers the tray 12 to move goods forward along the tray. As shown in FIG. 14, the entirety of the tray 12 may be moved to the open position by moving the tray to a selected distance away from the downstream conveyor 50, thereby creating an opening 56 for goods to fall off the tray 12. Movement of the tray between the open and closed positions may be performed with powered drive 70, which is functionally distinguishable from drive 16 which moves goods along the tray. When the tray is moving back to the closed position as shown in FIG. 15 and an obstacle 46 is encountered, magnets 32, 34 separate to avoid injury at the point of the obstruction. In this embodiment, the entire tray 12 rather than the forward end of the tray is thus moved between the open and closed position to control the distribution of goods from tray 12. The tray or pan 12 is attached by a magnetic coupling to the tray drive 70, and the entire tray breaks away from the tray drive if it experiences an obstruction.

Opposing magnets are particularly well suited for forming a separable connection for the conveyor safety device. Magnets inherently create a predictable and repeatable holding force and break-away strength. Magnets possess properties such that the holding force between mating magnets is predominantly determined by the relative distance of one mating magnetic face to the other. As the distance between the mating magnets increases via an impulse force generated by an obstruction, the holding force decreases exponentially. This type of separable connection is difficult or impossible to replicate using a purely mechanical coupling and decoupling device. These magnetic characteristics are well suited to a safety device since the goal is to minimize the force seen by an obstruction, such as an appendage, so that the holding force between components to very quickly dissipate, causing the decoupling to occur.

Multiple magnets placed in dimensionally-matching patterns between the mating parts create a re-coupling ability at substantially the same position every time due to the attraction of the magnetic poles. By using multiple magnets, the rated strength and/or quantity and/or size of the magnet can be easily adjusted/changed to fit the specific application and mass that is being held. Also, the relative distance between magnetic mating faces can be adjusted by use of non-magnetic shims and/or other mechanical means, such as positioning bolts, to change the holding strength and break-away force of the mated magnets. These variations and characteristics allow for great flexibility in customizing this concept to various types of conveyors.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A conveyor, comprising:
  a tray for supporting goods thereon;
  a powered drive for driving the tray in a forward direction at a first speed and in a backward direction at a second speed greater than the first speed, thereby moving goods along the tray;
  a gate supported on the tray for closing an opening in the tray and for opening to allow the goods to drop through the tray opening, the gate having a first magnet supported thereon; and
  a gate drive for moving the gate between the open and closed positions, the gate drive having a second magnet on a rod end of the gate drive for cooperation with the first magnet, such that magnetic forces pull the tray to the closed position, and the first and second magnets separate if the gate encounters a significant force when closing.

2. A conveyor as defined in claim 1, wherein the gate drive is a pneumatic cylinder.

3. A conveyor as defined in claim 1, wherein the gate slides with respect to the tray between the open and closed positions.

4. A conveyor as defined in claim 1, wherein the gate pivots with respect to the tray between the open and closed positions.

5. A conveyor as defined in claim 1, wherein the first magnet and the second magnet each include a plurality of magnets.

6. A conveyor as defined in claim 1, wherein each of the first and second magnets have substantially planar faces that engage when the magnets are coupled together.

7. A conveyor as defined in claim 6, wherein each of the first and second magnets move along their planar engaging surfaces until the first and second magnets are substantially aligned.

8. A conveyor as defined in claim 1, wherein the rod end of the gate drive includes an end member supporting the second magnet, and the rod end of a gate drive passes through a gate closing member connected to the gate, such that the gate closing member is spaced between the end member and the powered drive.

9. A conveyor, comprising:
  a tray for supporting goods thereon;
  a powered drive for driving the tray to move goods along the tray;
  a gate for opening to allow goods to drop from the tray and for closing to move goods along the tray;
  a separable connection connecting the gate and a gate drive for opening and closing the gate, the separable connection including a first magnet connected to the gate; and
  the separable connection further including a second magnet connected to the gate drive and having a polarity attracted to the first magnet for cooperation with the first magnet, such that magnetic forces pull the gate in one direction, and the first and second magnets separate if the gate encounters a significant force when moving in the opposite direction.

10. A conveyor as defined in claim 9, wherein the gate slides with respect to the tray between the open and closed positions.

11. A conveyor as defined in claim 9, wherein the gate pivots with respect to the tray between the open and closed positions.

12. A conveyor as defined in claim 9, wherein each of the first and second magnets have substantially planar faces that engage when the magnets are coupled together.

13. A conveyor, comprising:
  an elongate tray for supporting goods thereon;
  a powered drive for driving the tray to move goods along the tray;
  a gate supported on the tray for closing an opening in the tray and for opening to allow the goods to drop through the tray opening, the gate having a first magnet member supported thereon; and
  a gate drive for moving the gate between the open and closed positions, the gate driving connected to a second magnet member for cooperation with the first magnet member, such that magnetic forces pull the tray to the closed position, and the first and second magnets separate if the gate encounters a significant force when closing.

14. A conveyor as defined in claim 13, wherein the gate drive is a pneumatic cylinder.

15. A conveyor as defined in claim 13, wherein the gate slides with respect to the tray between the open and closed positions.

16. A conveyor as defined in claim 13, wherein each of the first and second magnet members have substantially planar faces that engage when the magnet members are coupled together.

17. A conveyor as defined in claim 16, wherein each of the first and second magnets move along their planar surfaces until the first and second magnets are substantially aligned.

18. A conveyor as defined in claim 13, wherein the gate pivots with respect to the tray between the open and closed positions.

19. A conveyor as defined in claim 13, wherein the first magnet is a magnet having a polarity attracted to the second magnet.

20. A conveyor as defined in claim 13, wherein each of the first and second magnets have substantially planar faces that engage when the magnet members are coupled together.

21. A conveyor, comprising:
a tray for supporting goods thereon;
a powered drive for driving the tray to move goods along the tray;
the tray movable with respect to a downstream conveyor from a closed position wherein the tray overlaps the downstream conveyor and an open position wherein the tray is spaced from the downstream conveyor to form an opening therebetween, the tray having a first magnet supported thereon; and
a gate drive for moving the tray between the open and closed positions, the gate drive having a second magnet for cooperation with the first magnet, such that magnetic forces pull the tray to the closed position, and the first and second magnets separate if the tray encounters a significant force when closing.

22. A conveyor as defined in claim 21, wherein the tray slides between the open and closed positions.

23. A conveyor as defined in claim 21, wherein the tray is supported on rollers when moving between the open and closed positions.

24. A conveyor as defined in claim 21, wherein each of the first and second magnets have substantially planar faces that engage when the magnets are coupled together.

* * * * *